TAPE HANDLING DEVICE

Filed July 18, 1961 3 Sheets-Sheet 1

ALEXANDER R. MAXEY
INVENTOR.

BY Robert H. Clay

ATTORNEY

Aug. 4, 1964 A. R. MAXEY 3,143,267

TAPE HANDLING DEVICE

Filed July 18, 1961 3 Sheets-Sheet 2

ALEXANDER R. MAXEY
INVENTOR.

BY Robert S. Clay

ATTORNEY

TAPE HANDLING DEVICE

Filed July 18, 1961 3 Sheets-Sheet 3

ALEXANDER R. MAXEY
INVENTOR.

BY Robert G. Clay

ATTORNEY

United States Patent Office 3,143,267
Patented Aug. 4, 1964

3,143,267

TAPE HANDLING DEVICE

Alexander R. Maxey, Redwood City, Calif., assignor to Ampex Corporation, Redwood City, Calif., a corporation of California Filed July 18, 1961, Ser. No. 124,842
12 Claims. (Cl. 226—95)

This invention relates to tape transports, and particularly to fluid-operated apparatus for driving, guiding and clamping the tape in such transports.

The known magnetic tape transport art includes guides that supply air under pressure to float the moving tape frictionlessly thereon, as well as other devices, such as brakes and capstans that frictionally engage the tape by means of "suction" pressure differentials (i.e., partial vacuum) applied thereto. However, when it is desired to construct a unitary device that combines both functions and that alternately clamps the tape by means of suction, and floats the tape by means of pressure, the art provides no useful instruction. The configuration that is most widely used for "suction" engagement of the tape by a capstan or brake is not well adapted for the opposite effect of providing flotation; and, conversely, the most efficient configuration for flotation has grave disadvantages when used with suction.

When a pneumatic tape clamping capstan, as taught in the art, is to be used primarily as a suction device, it is usually constructed as a rotating partial-vacuum housing having relatively large and widely spaced openings through which the vacuum is applied to the tape. However, such a housing, when used for applying pressure instead of suction, is characterized by severe instability of tape flotation. If the openings are large in proportion to the distance between the tape and housing, it follows that the spacing between the openings must be large in order for the housing to retain its primary characteristic as a pressure containing device. On the other hand, if the spacing between the openings is large, then the pressure at the tape surface is not evenly distributed, and imbalance results. The pressure tends to collapse at one point or another in a fluttering manner, causing the tape to be engaged temporarily with the housing and to be frictionally dragged thereacross. Also, the covering of one opening by the tape causes a quick and radical pressure change in other parts of the system and the instability is thus rendered more extreme. This effect is of course the opposite of that desired for tape flotation.

On the other hand the best known device for producing pressure flotation is a porous member through which pressurized air is forced in the direction of the tape. The small size of the openings on the tape side permits very close spacing between the openings, on the same order as, or smaller than, the distance between the member and the tape. As a result, the pressure is substantially evenly distributed at the tape surface and very stable flotation is obtained. Further, the natural intercommunication between the various tiny chambers in the porous member provides the effect of integrating or damping out incipient pressure changes in a given locality so as to maintain nearly constant pressure at every point. In effect, these tiny chambers behave as a matrix of expansion chambers interconnected by restricted openings. Thus a change in pressure in any particular chamber is laterally transmitted to the neighboring chambers and beyond only after considerable time delay, caused by the necessary expansion of the fluid from one chamber to another. Delayed in this manner, the pressure change cannot seriously affect the stability of the tape before the circumstances that initiated the change have been reversed.

However, the porosity of the material, of such advantage for flotation, becomes a grave disadvantage when it is desired to suddenly apply suction. When suction is applied to the tape through the thickness of the porous material, the flotation effect is slow in dying and the desired clamping effect is even further delayed. Such delay is intolerable in the uses projected for high-speed start-stop-and-reverse tape transports.

Thus it appears that large-apertured members, as used in the art, are effective for suction clamping but ineffective for flotation; and that porous members, as used in the art, are effective for flotation but ineffective for suddenly applying clamping suction.

Accordingly, it is an object of this invention to provide a fluid-pressure device suitable for alternately floating tape frictionlessly thereon, clamping the tape solidly thereto, and operating at very high speed.

It is another object of this invention to provide a tape-driving capstan and pinch assembly operable at high speed to start and drive the tape and capable of being rendered instantly inoperative so as to disengage the tape therefrom and eliminate all frictional contact therebetween.

It is a further object of this invention to provide a tape-floating frictionless guide capable of being instantly converted into a clamping friction brake or drag member for the tape.

These and other objects of the invention are attained in a device in which a porous member (capstan or guide) is supplied with low, fluid or air, pressure so as to cause flotation of the tape, and a clamping member is provided for selectively directing air under greater pressure on the opposite side of the tape so as to suddenly overcome the flotation pressure and clamp the tape to the porous member.

Other objects and advantages of the present invention will be readily apparent from the following description and claims considered together with the accompanying drawing, in which:

Figure 1:
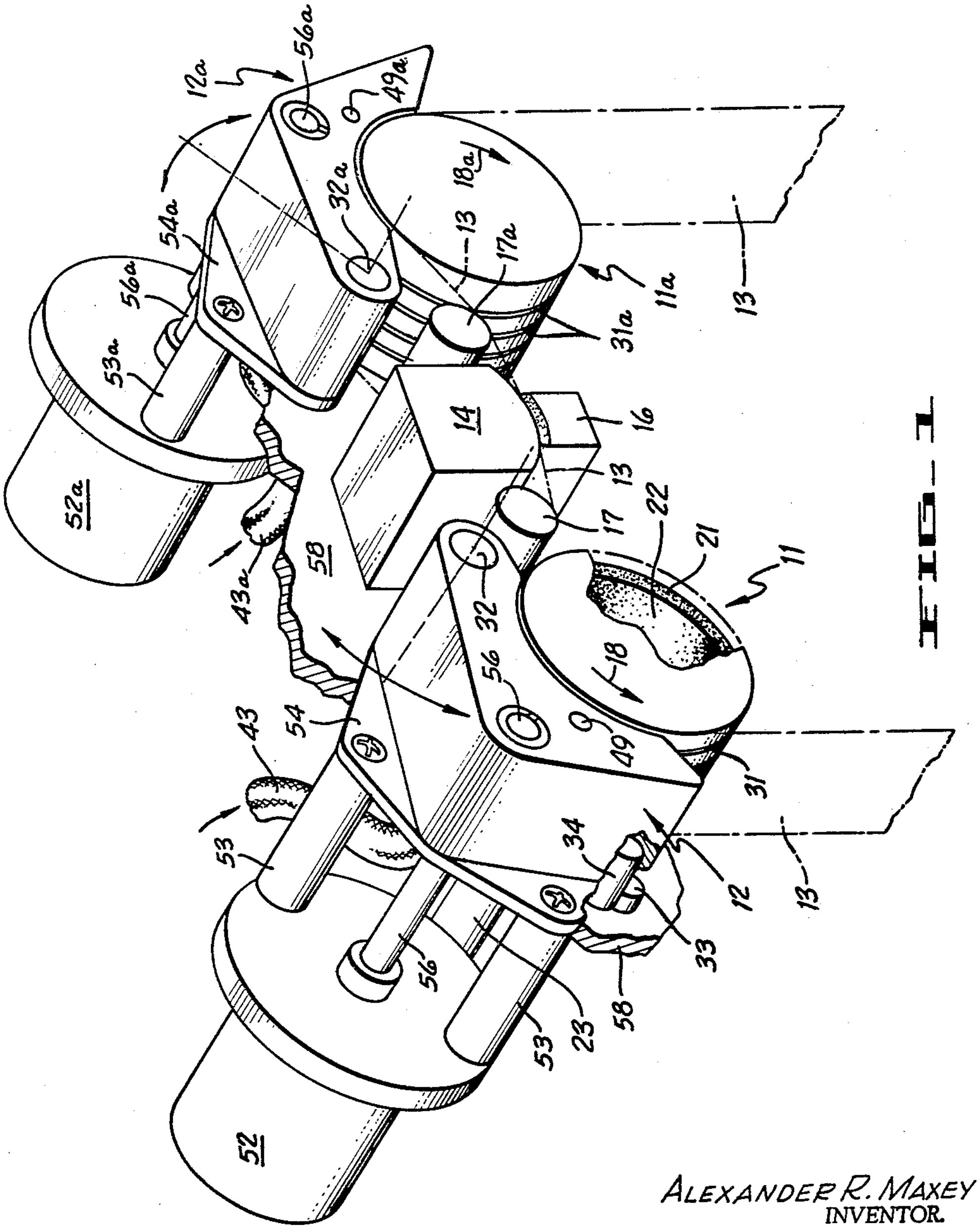
FIGURE 1 is a broken-away perspective view of an apparatus constructed in accordance with the invention.

Referring now to FIGURE 1, a pair of capstans 11 and **11*a* and a pair of mating female guides 12 and 12*a* for the support and movement of a magnetic tape 13 are shown. The capstans 11 and 11*a* and guides 12 and 12*a*, respectively, are symmetrically similar and corresponding reference numerals will be used hereinafter to describe the various parts of each. Between the capstans 11 and 11*a* are positioned a transducing head means 14, a pressure pad 16, and a pair of stationary tape guide posts 17 and 17*a* for guiding and processing the tape 13. In operation, the tape 13 is moved in either the forward or reverse direction across the head assembly 14. The capstan 11 rotates constantly in a counter-clockwise direction as seen from the front, and the capstan 11*a* rotates constantly in a clockwise direction as indicated by arrows 18, 18*a*, respectively. The driving means for the capstans is of a type standard in the art and is not here shown. The apparatus is arranged so that when the tape 13 is to be moved in a forward direction (toward the right in the drawing), the capstan 11*a* engages the tape while the tape floats frictionlessly on a cushion of pressurized air over capstan 11; and when the tape is to be moved in the reverse direction (toward the left in the drawing), the capstan 11 engages the tape and the tape floats on a cushion of air over the capstan 11***a*.

The apparatus is particularly arranged so that each capstan 11, 11*a* floats the tape 13 except when an overwhelming air pressure is directed against the tape and capstan from the corresponding female guide 12, 12*a*. For the purpose of floating the tape, the capstan 11 is constructed as a hollow cylindrical pressure housing, the cylindrical walls 21 of which are formed of a porous material such as the commercial porous metal "Oilite"; and the interior cavity 22 of the capstan is coupled through the hollow capstan drive shaft 23 (FIGURE 2), a pneumatic sealed joint 24, and a conduit 26 to the high pressure side of a source 27 of pressurized air. For the purposes of this disclosure, the term "pressurized" air or fluid means air or fluid at a pressure greater than ambient atmospheric pressure. For clarity in FIGURE 2, the joint 24 and conduit 26 associated with capstan 11 are not shown, but the corresponding elements 24*a* and 26*a* associated with capstan 11*a* are shown. The joint 24*a* is in the form of a manifold member surrounding the shaft 23*a*, the wall of the hollow shaft being pierced by three radially directed openings for passage of air from the joint 24 to the interior of the shaft. Thus, the cavity 22 is always maintained at a given level of pressure, and the air therein is forced through the tortuous microscopic passages of the porous wall 21 to the surface of the tape 13. The porous wall 21 in effect defines a plurality of microscopic expansion chambers distributed in depth transversely through the wall and intercommunicating through restricted openings therebetween. The air coming from the exterior surface of the porous wall 21 is substantially evenly distributed and is directed against the tape surface at a pressure that is substantially less than the pressure inside the cavity 22, but is appreciably greater than the ambient air pressure. Thus, a cushion of stable pressurized air is formed between the capstan and the tape and serves to float the tape frictionlessly thereon against the force applied by the tape tensioning means (not shown). The intercommunication between the various chambers and passages within the porous wall has the effect of damping out incipient pressure changes in the cushion of air. If, for example, the tape suddenly covers and seals a few of the openings, the pressure behind the openings does not appreciably build up because some of the interconnected passages are always exposed to the ambient atmosphere. Thus those openings that are covered by the tape are accorded at least delayed relief to ambient pressure. Furthermore, it will be seen that the capstan is always rapidly rotating so that no particular portion of the capstan surface stays beneath the tape for a very long period of time. The communication of the passages to atmospheric pressure may be enhanced by the provision of a number of circumferential grooves 31 (FIGURE 3) formed in parallel planes normal to the axis of the capstan 11. Such grooves also have an advantage when it is desired to clamp the tape to the capstan as hereinafter described.

To clamp the tape to the capstan, the full pressure of the high pressure side of the source 27 is applied to the opposite side of the tape 13 through the female guide 12. It will be understood that there is a substantial pressure gradient transversely through the thickness of the porous wall of the capstan, so that the pressure in the tape flotation cushion is always substantially less than the pressure in the cavity 22, which equals the pressure of the high side of the source 27. Consequently when the full pressure of the source 27 is applied to the opposite side of the tape a substantial pressure differential results. The pressure from the female guide completely overcomes the pressure exerted by the capstan air cushion and forces the tape into solid frictional engagement with the capstan surface, with the grooves 31 providing a quick relief path for the air of the cushion. However, the pressure on the capstan side of the tape does not appreciably change even when the tape is clamped to the capstan, because of the effect previously described of the porous material in damping out incipient pressure changes, and also because of the exposure of a portion of the capstan openings to ambient pressure and the rapid rotation of the capstan.

Figure 2:
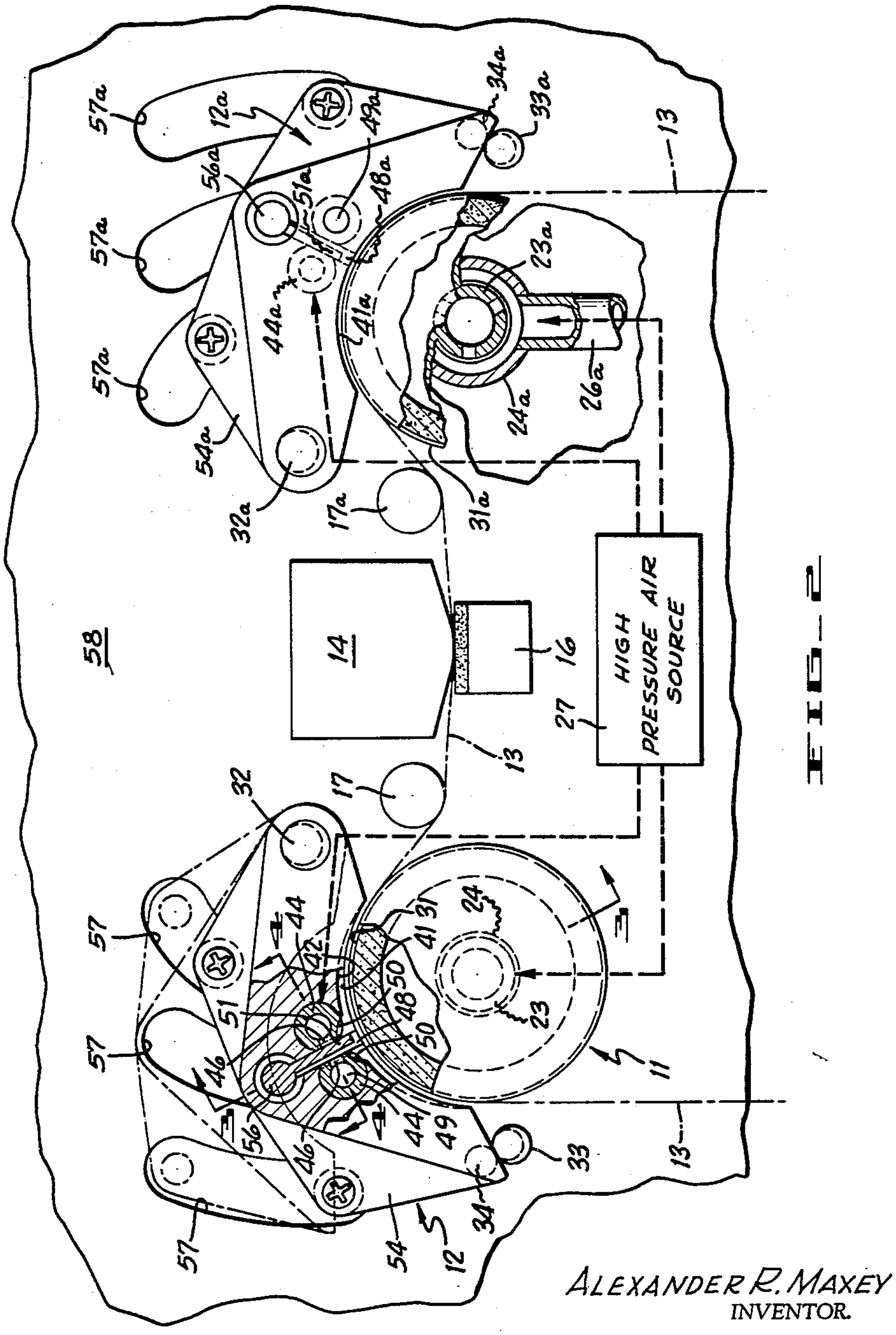
FIGURE 2 is a broken-away elevation view of a portion of the apparatus shown in FIGURE 1.
Figure 4:
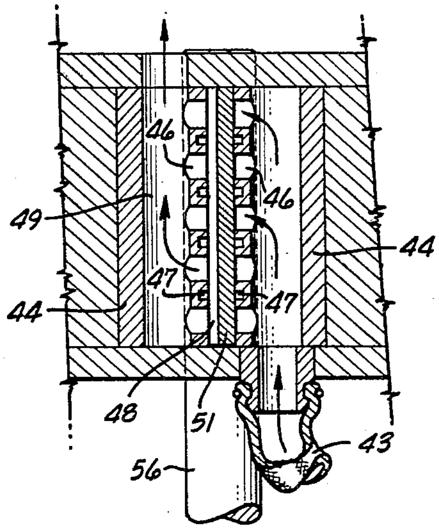
FIGURE 4 is a cross-sectional view taken substantially on the plane of lines 4—4 of FIGURE 2.
Figure 3:
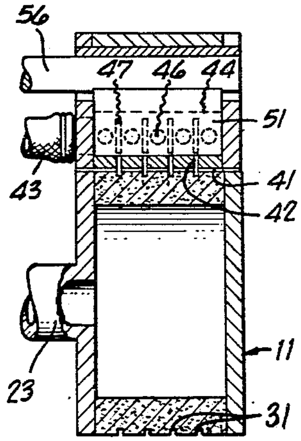
FIGURE 3 is a cross-sectional view taken substantially on the plane of lines 3—3 of FIGURE 2.

In FIGURE 2, the female guide 12 is shown in phantom in an open position as if for threading of the tape, while the female guide 12*a* is shown in a closed or operative position. The guides being of similar construction, only the guide 12 will be described.

The guide 12 is mounted on a pivot shaft 32, which extends from the recorder top plate 58, and is eccentrically rotatable for convenience in precisely adjusting the position of the guide 12 relative to the capstan in the closed position. An eccentrically rotatable stop post 33 is mounted on the recorder top plate 58 at the opposite side of the capstan and engages an extending leg 34 of the guide 12 when the guide is in the closed position. Thus, the stop post 33 does not interfere with threading of the tape around capstan 11. The guide is spring loaded toward the closed position but may be held open by hand to facilitate the tape threading operation. The spring for the guide 12 is not here shown, but may be for example a coil spring mounted on the shaft 32 and coupled to the guide 12 and top plate 58.

It will be seen that the guide 12 has a curved face 41 conforming to the shape of the side wall 21 of the capstan and spaced very slightly therefrom when the guide is in the closed position. The exact alignment and spacing of this face 41 is adjustable by means of the eccentrically rotating pivot shaft 32 and stop post 33. The face 41 may also have a series of parallel grooves 42 (FIGURES 2 and 3) lying in planes normal to the axis of capstan 11 for the quick distribution and exhaustion of air pressure.

Referring now to FIGURES 2–5, it will be seen that the air pressure comes to the guide 12 through a flexible hose 43 coupled to a manifold sleeve 44 that is inset in the guide 12. The manifold 44 has a number of openings 46 formed in the side wall thereof and interspersed with grooves 47 for the more rapid passage of air to the face 41 and application to the tape when clamping is desired. A passageway 48 is formed in the guide 12 communicating from the central portion of the face 41 and directed generally radially away from the axis of capstan 21. The manifold sleeve 44 is positioned so that the openings 46 thereof communicate directly with the passageway 48 and to the face 41 and tape. On the opposite side of the passageway 48 is a second manifold 44 of similar construction and arranged to communicate between the passageway 48 and an upper opening 49 that is exposed to the ambient atmosphere. After the manifolds 44 are assembled in the guide 12, a circular saw cut 50 is made at the level of each of the grooves 47 so that both the grooves 47 and the grooves 42 are extended to come into communication. Within the passageway 48 is mounted a pivotable, quick acting valve gate flipper member 51 that is arranged to swing from side to side of the passageway 48 so as to block either one or the other of the manifolds 44 and thus either apply pressure to the tape 13 or withhold pressure therefrom to clamp or permit flotation of the tape with respect to the capstan 11.

The flipper member 51 is mounted as follows. An actuator 52, here shown as a solenoid, is mounted by brackets 53 from a lower plate 54 of the guide 12. The solenoid is operable to rotate a shaft 56 extending upwardly into the guide 12; and the flipper member 51 is affixed to the shaft 56. The solenoid 52 moves with the female guide 12 when the latter pivots away from the capstan for threading purposes, the brackets 53 and shaft 56 extending through curved openings 57 in the recorder top plate 58.

Figure 6:
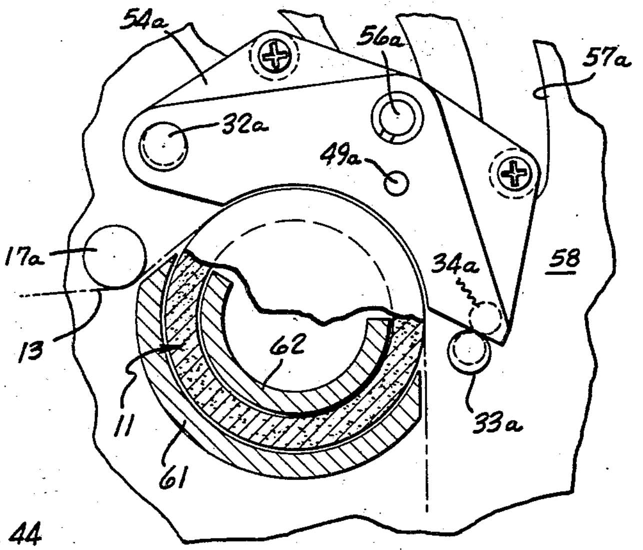
FIGURE 6 is a broken-away elevation view of a modification of a portion of the apparatus shown in FIGURE 2.
Figure 5:
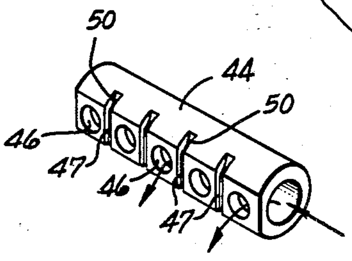
FIGURE 5 is an enlarged perspective view of a portion of the apparatus as shown in FIGURE 2.

A modified form of the invention is shown in FIGURE 6 wherein a pair of pressure shield members 61 and 62 are mounted to closely conform to the outer and inner faces of the porous side wall 21 of the capstan in the sector that is not covered by the tape 13. Thse members help to conserve air that is not applied directly to the tape.

In operation, the guide members 12 and **12*a* are pivoted back and away from the respective capstans and the tape 13 is threaded on the capstans around the guides 17 and 17*a* and between the transducing head assembly 14 and pressure pad 16. The guides 12 and 12*a* are then adjusted to their closed positions and the machine is set in operation. So long as the flipper members 51 of the female guides remain in position to close off the pressure source 27, the tape floats equally on both capstans and is not moved in either direction. When it is desired to move the tape to the right (forward) the solenoid 52*a* for the female guide 12*a* is operated to open the flipper 51 to the source 27 and to close the exhaust port 49*a*. Thus overwhelming pressure is applied to the tape on the capstan 11*a* and the tape is clamped to the rotating capstan and moved thereby. When it is desired to move the tape in the opposite direction (reverse), the solenoid 52*a* is deenergized and the solenoid 52 is energized, so that the tape is clamped to capstan 11 and merely floats upon capstan 11*a***.

If desired, the exhaust port 49 can be connected to the low pressure side of the source 27; and the solenoid 52 is replaced by apparatus of a type known in the art that operates between three positions, including the two described and one neutral position in the center of passageway 48. In the neutral position of the flipper 51, the air flows out of the vacuum or low-pressure port 49 as fast as it enters through the high pressure manifold 44, and the only substantial pressure acting on the tape is the flotation pressure from capstan 11. Thus the operation of the solenoid 52 either causes the tape to float upon the capstan 11 (neutral position of flipper 51) or to be clamped to the capstan, or to be clamped to the surface 41 of the guide 12.

Thus there has been described a tape supporting apparatus including a capstan for directing evenly distributed pressurized air against one surface of the tape so as to provide stable lubricated clamping of the tape on the capstan, and means for directing more highly pressurized air against the opposite side of the tape so as to cause collapse of the flotation and clamping of the tape against the capstan.

What is claimed is:

1. In a tape transport, apparatus for processing said tape, comprising: means for directing a first evenly and stably distributed pressurized fluid against a first surface of said tape so as to provide stable lubricated flotation of said tape with respect to said means; and means having a first operative position permitting said flotation and a second operative position for selectively and substantially instantaneously directing a second more highly pressurized fluid against the opposite side of said tape so as to cause collapse of said flotation and clamping of said tape against said first named means.

2. In a tape transport, apparatus as characterized in claim 1, wherein said first named means is formed as a rotating driving capstan for said tape, whereby said capstan means is caused to drive said tape when said second named means is in the second operative position and whereby said tape floats on the surface of said capstan when said second named means is in the first operative position.

3. In a tape transport, apparatus for processing said tape, comprising: a source of pressurized fluid having a first predetermined pressure greater than atmospheric; means coupled to said source for receiving a portion of said pressurized fluid and for causing stable and even distribution and partial expansion of said fluid to a second pressure substantially lower but greater than atmospheric pressure against a first surface of said tape to provide stable lubricated flotation of said tape with respect to said means; and means coupled to said source for receiving another portion of said pressurized fluid, said last named means having a first operative position in which said other portion of fluid is withheld from said tape, and a second operative position in which said other portion of fluid is substantially instantaneously directed against the opposite side of said tape at substantially said first pressure so as to cause collapse of said flotation and clamping of said tape against said first named means.

4. Apparatus as characterized in claim 3 wherein said first named means includes a pressure housing having microscopic openings formed in the walls thereof and opening toward said tape, said openings being arranged to be at least partly open to the ambient atmosphere when said tape is clamped against said pressure housing.

5. Apparatus as characterized in claim 4 wherein said openings are arranged as a plurality of microscopic expansion chambers disposed in depth transversely through the walls of said housing and intercommunicating through restricted openings therebetween, at least some of said intercommunicating chambers being open to the ambient atmosphere when said tape is engaged with said pressure housing.

6. In a tape transport, a capstan drive apparatus, comprising: a capstan formed and mounted as a rotating hollow housing, the walls of which are provided with outwardly opening microscopic openings therethrough; means for guiding a flat side of said tape around a portion of the periphery of the capstan; a source of pressurized fluid coupled to said capstan for transmitting said fluid to the interior thereof, whereby said fluid is partially expanded and depressurized in passage through said microscopic openings and is evenly and stably distributed at a reduced but greater than atmospheric pressure against the confronting surface of said tape so as to cause stable flotation of said tape relative to said capstan even when said capstan is rotating; and means coupled to said source for receiving another portion of said pressurized fluid, said last named means having a first operative position in which said other portion of fluid is withheld from said tape, and a second operative position in which said other portion of fluid is substantially instantaneously directed against the opposite side of said tape at full pressure so as to cause collapse of said flotation and clamping of said tape against said capstan for the driving of said tape, and said openings being arranged to be at least partly open to the ambient atmosphere when said tape is clamped against said capstan.

7. In a tape transport, a capstan drive apparatus, comprising: a capstan formed and mounted as a rotating hollow cylindrical housing, the side wall of which are formed of porous material; means for guiding a flat side of said tape around a portion of the periphery of the capstan; a source of pressurized fluid coupled to said capstan for transmitting said fluid to the interior thereof, whereby said fluid is partially expanded and depressurized in passage through said porous walls and is evenly and stably distributed at a reduced but greater than atmospheric pressure against the confronting surface of said tape so as to cause stable flotation of said tape relative to said capstan even when said capstan is rotating; and means coupled to said source for receiving another portion of said pressurized fluid, said last named means having a first operative position in which said other portion of fluid is withheld from said tape, and a second operative position in which said other portion of fluid is substantially instantaneously directed against the opposite side of said tape at full pressure so as to casue collapse of said flotation and clamping of said tape against said capstan.

8. In a tape transport, a capstan drive apparatus, comprising: a capstan formed and mounted as a rotating hollow cylindrical housing, the side walls of which are formed of porous material; means for guiding a flat side of said tape across the periphery of the capstan; a source of pressurized fluid coupled to said capstan for transmitting said fluid to the interior thereof, whereby said fluid is partially expanded and depressurized and is directed in a stable and even distribution and at a reduced pressure against the confronting surface of said tape so as to cause stable flotation of said tape relative to said capstan even when said capstan is rotating; and means coupled to said source for receiving another portion of said pressurized fluid, said last named means including a member provided with a curved face conforming to the portion of said capstan that is traversed by said tape and spaced slightly therefrom to define a gap for the passage of said tape, a passageway extending from said curved face of said member and dividing into two branches, a first of said branches being open to the ambient atmosphere and the second of said branches communicating with said source of pressurized fluid, and a valve gate member mounted at the junction of said two branches and movable between first and second positions, said gate in the first position thereof closing said first branch to atmosphere and opening said second branch for the passage of said pressurized fluid to said tape, and said gate in the second position thereof closing said second branch and opening said first branch to exhaust said curved face to the atmosphere.

9. In a tape transport, a capstan drive apparatus, comprising: a capstan formed and mounted as a rotating hollow cylindrical housing, the side walls of which are formed of porous material; means for guiding a flat side of said tape across the periphery of the capstan; a source of pressurized fluid coupled to said capstan for transmitting said fluid to the interior thereof, whereby said fluid is partially expanded and depressurized and is directed in a stable and even distribution and at a reduced pressure against the confronting surface of said tape so as to cause stable flotation of said tape relative to said capstan even when said capstan is rotating; and means coupled to said source for receiving another portion of said pressurized fluid, said last named means including a member provided with a curved face conforming to the portion of said capstan that is traversed by said tape and spaced slightly therefrom to define a gap for the passage of said tape, a passageway extending from said curved face of said member and having two branches extending from opposite sides thereof, a first of said branches being open to the ambient atmosphere and the second of said branches communicating with said source of pressurized fluid, and a valve gate flipper pivotably mounted in said passageway between said two branches and pivotable between first and second positions, said flipper in the first position thereof closing said first branch to atmosphere and opening said second branch for the passage of said pressurized fluid to said tape, and said gate in the second position thereof closing said second branch and opening said first branch to exhaust said curved face to the atmosphere.

10. Apparatus as characterized in claim 9, wherein said capstan and said face of said first-named member are provided with parallel grooves lying in planes normal to the axis of said capstan for the distribution of air; and also including shield means mounted adjacent at least the outer surface of said porous capstan in the zone thereof that is free of said tape, for reducing the loss of air in said zone.

11. Apparatus as characterized in claim 10 wherein said shield means includes a shield mounted adjacent the inner surface of said porous capstan in said zone for reducing said loss of air.

12. In a tape transport, a capstan drive apparatus, comprising: a capstan formed and mounted as a rotating hollow cylindrical housing, the side walls of which are formed of porous material; means for guiding a flat side of said tape across the periphery of the capstan; a source of pressurized air having a low-pressure side and a high-pressure side coupled to said capstan for transmitting said pressurized air to the interior thereof, whereby said air is partially expanded and depressurized and is directed in a stable and even distribution and at a reduced pressure against the confronting surface of said tape so as to cause stable flotation of said tape relative to said capstan even when said capstan is rotating; and means coupled to the high-pressure side of said source for receiving another portion of said pressurized air, said last named means including a member provided with a curved face conforming to the portion of said capstan that is traversed by said tape and spaced slightly therefrom to define a gap for the passage of said tape, a passageway extending from said curved face of said member and having two branches extending from opposite sides thereof, a first of said branches being coupled to the low-pressure side of said air source and the second of said branches communicating with the high-pressure side of said source, and a valve gate flipper pivotably mounted in said passageway between said two branches and pivotable between first, second and third positions, said flipper in the first position thereof closing said first branch to low-pressure and opening said second branch for the passage of said pressurized air to said tape, said flipper in the second position thereof closing said second branch and opening said first branch to exhaust said curved face and to cause said tape to be clamped to said member, and said flipper in the third position thereof being centralized in said passageway so as to open both of said branches and to cause said tape to float freely in said gap.

References Cited in the file of this patent

UNITED STATES PATENTS

| | | |
|---|---|---|
| 2,852,253 | Pouliart | Sept. 16, 1958 |
| 2,954,911 | Baumeister et al. | Oct. 4, 1960 |
| 3,032,246 | Fritze | May 1, 1962 |

FOREIGN PATENTS

| | | |
|---|---|---|
| 677,882 | Germany | June 8, 1939 |